United States Patent
Ohtomo et al.

(10) Patent No.: US 7,319,512 B2
(45) Date of Patent: Jan. 15, 2008

(54) SURVEYING INSTRUMENT

(75) Inventors: Fumio Ohtomo, Itabashi-ku (JP); Kaoru Kumagai, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 180 days.

(21) Appl. No.: 11/137,599

(22) Filed: May 25, 2005

(65) Prior Publication Data
US 2005/0275824 A1 Dec. 15, 2005

(30) Foreign Application Priority Data
Jun. 10, 2004 (JP) ............... 2004-172494

(51) Int. Cl.
*G01C 3/08* (2006.01)
(52) U.S. Cl. ............ 356/4.03; 356/4.01; 356/4.1
(58) Field of Classification Search ........... 356/4.03
See application file for complete search history.

(56) References Cited
U.S. PATENT DOCUMENTS
6,788,817 B1  9/2004 Saka et al. ............ 382/199
6,847,462 B1 * 1/2005 Kacyra et al. ........... 356/601

FOREIGN PATENT DOCUMENTS

| EP | 1 422 499 | 5/2004 |
|---|---|---|
| EP | 1 493 990 | 1/2005 |
| JP | 2000-329517 | 11/2000 |
| JP | 2001-134771 | 5/2001 |
| WO | 2004/044528 | 5/2004 |

OTHER PUBLICATIONS

Copy of the European Search Report dated Sep. 15, 2005.

* cited by examiner

*Primary Examiner*—Thomas H. Tarcza
*Assistant Examiner*—Luke D. Ratcliffe
(74) *Attorney, Agent, or Firm*—Nields & Lemack

(57) ABSTRACT

A surveying instrument for projecting a distance measuring light to an object to be measured and for measuring a distance from a reflected light, comprising at least an image pickup unit for picking up an image of a spreading range of the distance measuring light, and a control unit for performing edge extraction from the image captured by the image pickup unit and for judging whether there is an edge or not within the spreading range.

8 Claims, 5 Drawing Sheets

SURVEYING INSTRUMENT

BACKGROUND OF THE INVENTION

The present invention relates to a surveying instrument for performing light wave distance measurement by projecting a laser beam to an object to be measured. In particular, the present invention relates to a surveying instrument of non-prism type, which does not use a prism on the object to be measured.

In recent years, a surveying instrument of non-prism type has been propagated, which does not use a prism on the object to be measured but performs the measurement by projecting a laser beam directly to the object to be measured and performs measurement based on a reflection light from the object to be measured.

In the surveying instrument of non-prism type, there is no need to move the prism for each measurement. Thus, the operation can be carried out by a single operator. Further, an arbitrary portion of the object to be measured, e.g. a construction, can be selected as a measuring point. Because the measurement can be made for a multiple of measuring points, 2-dimensional or 3-demensional measurement can be made on the object to be measured.

A surveying instrument of non-prism type is disclosed, for instance, in JP-A-2000-329517.

FIG. 6 represents a case where surveying operation is performed by using a surveying instrument of non-prism type.

In FIG. 6, reference numeral 1 denotes a surveying instrument, and 2 denotes an object to be measured.

When light wave distance measurement is performed, a laser beam (a distance measuring light 3) projected from the surveying instrument has a certain spreading. When the object to be measured is a 3-dimensional object, e.g. a construction such as a building, etc., the construction has ridge lines 4 (edges 4*a*, 4*b*, 4*c*, . . . ) between wall surfaces.

When a measuring point is selected near the edge 4*a* in the object to be measured 2 or when a measuring point is selected in any manner as desired, the measuring point thus selected (a projecting position of the distance measuring light 3) may be on the ridge line 4, e.g. on the edge 4*a*.

When the measuring point is on the edge 4*a*, the distance measuring light 3 projected from the surveying instrument 1 is split at the edge 4*a* as shown in FIG. 7. A part of the distance measuring light 3 is reflected by a surface 5 on this side, and the other part of the light is reflected by a surface at a further depth. As a result, the surveying instrument 1 performs measurement by a reflection light from the surface 5 of this side and by the reflection light from the surface 6 at the further depth. Thus, the portion of the edge 4*a* may not be measured correctly.

In the past, for the confirmation of the measuring point, it has been practiced that a surveying operator has been collimating the measuring point via a telescope 7 mounted on the surveying instrument 1. When the measuring point is on the edge 4*a*, the measuring point is shifted from the edge 4*a*.

However, because the telescope 7 is normally a monocular instrument, a point to be measured is seen as a part of a plane. Because the instrument is of high magnification factor, the edge 4*a* may not be recognized sometimes. Also, there is a case where measurement is made without being aware that the measuring point is on the edge 4*a*. In such case, the measured value may be turned to an error.

SUMMARY OF THE INVENTION

It is an object of the present invention to provide a surveying instrument, by which it is possible to judge whether a measuring point is on an edge or not. This prevents erroneous measurement when the measuring point is on the edge and contributes to improvement of measurement accuracy.

To attain the above object, the present invention provides a surveying instrument for projecting a distance measuring light to an object to be measured and for measuring a distance from a reflected light, comprising at least an image pickup unit for picking up an image of a spreading range of the distance measuring light, and a control unit for performing edge extraction from the image captured by the image pickup unit and for judging whether there is an edge or not within the spreading range.

Also, the present invention provides the surveying instrument as described above, wherein edge extraction is performed for the spreading range. Further, the present invention provides the surveying instrument as described above, wherein edge extraction is performed for an entire range of the pickup image.

Also, the present invention provides the surveying instrument as described above, further comprising a notifying means, wherein the notifying means notifies that the measuring point is inadequate when there is an edge in the spreading range. Further, the present invention provides the surveying instrument as described above, wherein the notifying means is a display unit, and the display unit displays a caution notice when there in an edge within the spreading range.

Also, the present invention provides the surveying instrument as described above, wherein distance measurement is performed after it is judged whether an edge is present or not within the spreading range, and in case it is judged that there is an edge within the spreading range, the control unit stops distance measuring operation. Further, the present invention provides the surveying instrument as described above, wherein distance measurement is performed before it is judged whether an edge is present or not within the spreading range, and in case it is judged that there is an edge within the spreading range, the control unit deletes a measurement result or makes the measurement result invalid. Also, the present invention provides the surveying instrument as described above, wherein in case the control unit judges that there is an edge within the spreading range and in case it is confirmed that the measuring point is adequate, there is provided a canceling switch to make the judgment by the control unit invalid.

According to the present invention, a surveying instrument, which projects a distance measuring light to an object to be measured and measures a distance from a reflected light, comprises at least an image pickup unit for picking up an image of a spreading range of the distance measuring light, and a control unit for performing edge extraction from the image captured by the image pickup unit and for judging whether there is an edge or not within the spreading range. As a result, based on the result of judgment, it is possible to judge whether the measuring point is adequate or not or it is possible to judge whether the result of distance measurement is adequate or not.

According to the present invention, the surveying instrument further comprises a notifying means, wherein the notifying means notifies that the measuring point is inadequate when there is an edge in the spreading range. Thus, the operator can be aware immediately when the measuring point is not adequate, and this contributes to the improvement of working efficiency.

According to the present invention, in the surveying instrument, distance measurement is performed after it is judged whether an edge is present or not within the spreading range, and in case it is judged that there is an edge within the spreading range, the control unit stops distance measuring operation. As a result, useless work can be avoided.

According to the present invention, in the surveying instrument, distance measurement is performed after it is judged whether an edge is present or not within the spreading range, and in case it is judged that there is an edge within the spreading range, the control unit deletes a measurement result or makes the measurement result invalid. Thus, it is possible to prevent occurrence of measurement error, and this contributes to the improvement of measurement accuracy and reliability.

According to the present invention, in the surveying instrument, in case the control unit judges that there is an edge within the spreading range and in case it is confirmed that the measuring point is adequate, there is provided a canceling switch to make the judgment by the control unit invalid. As a result, it is possible to continue measurement in easy manner and this contributes to the improvement of working efficiency.

DETAILED DESCRIPTION OF THE PREFERRED EMBODIMENT

Figure 1:
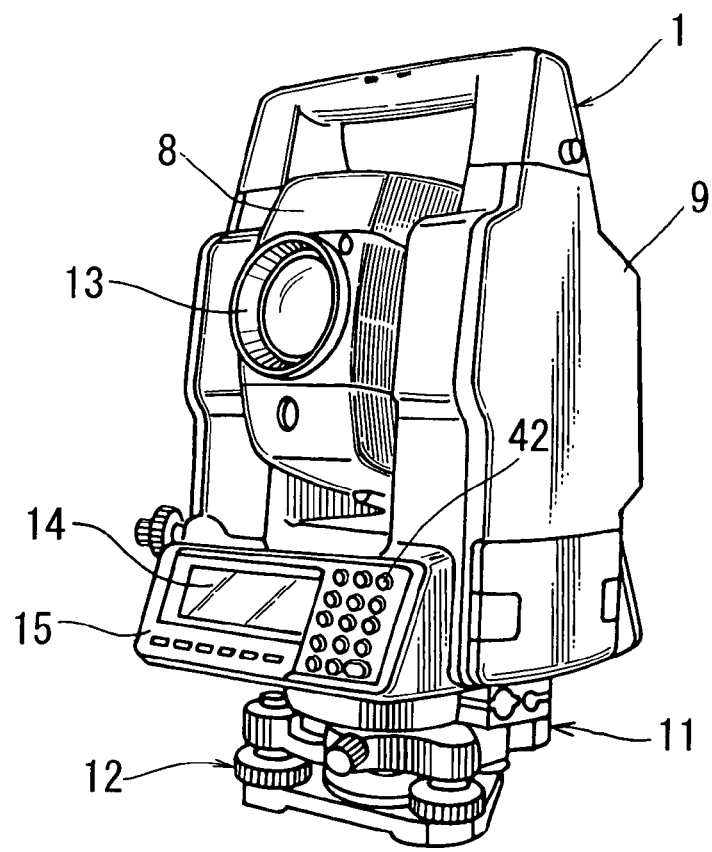
FIG. 1 is a perspective view of a surveying instrument according to an embodiment of the present invention.

Detailed description will be given below on the best mode of the invention for carrying out the present invention referring to the drawings.

FIG. 1 shows an external view of a surveying instrument 1 according to the present invention. The surveying instrument 1 comprises an electronic theodolite for detecting angles (a vertical angle and a horizontal angle) and a light wave distance measuring instrument.

The surveying instrument 1 primarily comprises a telescope unit 8, a frame unit 9 for rotatably supporting the telescope unit 8 in a vertical direction, a base unit 11 for rotatably supporting the frame unit 9 in a horizontal direction, and a leveling unit 12 for supporting the base unit 11. The leveling unit 12 can be mounted on a tripod or the like.

An optical system including an objective lens 13, the light wave distance measuring instrument, an image pickup unit, etc. are incorporated in the telescope unit 8. The frame unit 9 comprises a display unit 14, an operation/input unit 15, and a control unit 16 (to be described later).

Figure 3:
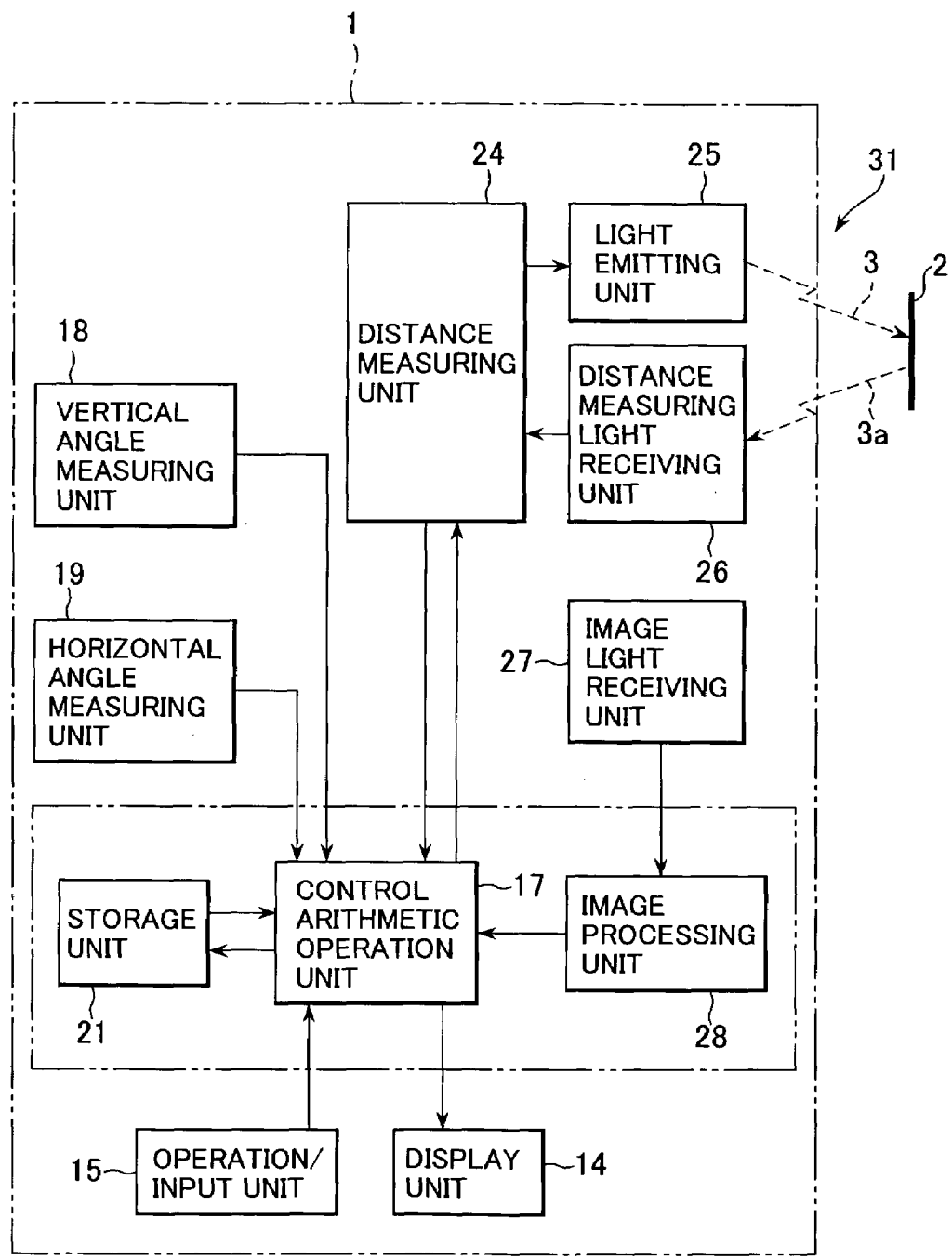
FIG. 3 is a schematical block diagram of the surveying instrument.

Referring to FIG. 3, description will be given now on general arrangement of the surveying instrument 1.

In the figure, reference numeral 1 denotes the surveying instrument, and reference numeral 2 denotes an object to be measured.

The surveying instrument 1 primarily comprises the display unit 14, the operation/input unit 15, a control arithmetic operation unit 17, a vertical angle measuring unit 18, a horizontal angle measuring unit 19, a storage unit 21, a distance measuring unit 24, a light emitting unit 25, a distance measuring light receiving unit 26, an image light receiving unit 27, an image processing unit 28, and an optical system 31, etc. The control arithmetic operation unit 17, the storage unit 21, and the image processing unit 28 make up together the control unit 16. The optical system 31 and the image light receiving unit 27 make up together the image pickup unit.

From the operation/input unit 15, a surveying operator inputs a measurement starting command, a measuring condition, etc. when distance is measured. The operation/input unit 15 comprises a canceling switch 42 (See FIG. 1) for canceling arithmetic operation. On the display unit 14, surveying condition during the surveying operation, a result of surveying, or an image taken during surveying, or a result of image processing are displayed.

The control arithmetic operation unit 17 is a CPU, for instance. Based on a command from the operation/input unit 15, program starting, control processing of signal, arithmetic operation, or driving and controlling of the display unit 14 and the distance measuring instrument 24, etc. can be executed.

The control arithmetic operation unit 17 associates each image data signal inputted from the image processing unit 28 with surveying data when the image data is taken (e.g. a vertical signal from the vertical angle measuring unit 18, a horizontal angle signal from the horizontal angle measuring unit 19, and a distance signal from the distance measuring unit 24), and the image data signals, the surveying data and the association of the image data signals with the surveying data are stored in the storage unit 21.

To associate the image data signal with the surveying data, a recording area is prepared in the storage unit 21 for each measuring point. Further, an image data signal storage area and a surveying data storage area are prepared within the recording area, and the image data signal and the surveying data for each measuring point are recorded by being associated with each other. Or, an image data signal storage area and a surveying data storage area are prepared in the storage unit 21. The image data signal and the surveying data are separated from each other, and the image data signal and the surveying data are stored in the image data signal storage area and the surveying data storage area respectively. Also, a management data is prepared to link the image data signal with the surveying data. Thus, association is carried out by the method already known.

The vertical angle measuring unit 18 measures a vertical angle with respect to a horizontal line when the object to be measured 2 is collimated by the optical system 31. The horizontal angle measuring unit 19 measures a horizontal angle of the object to be measured 2 with respect to a reference direction when a predetermined direction is defined as a reference direction.

The distance measuring light receiving unit 26 receives a reflection distance measuring light 3a reflected by the object to be measured 2. The image processing unit 28 is an image pickup device such as a CCD, etc. It is an aggregate of a multiple of pixels, and address (a position on an image pickup element) of each pixel can be specified. A natural light from the object to be measured 2 enters, and an image of the object to be measured 2 is received.

In the storage unit 21, there are stored a sequence program, and image processing program, a calculating program, etc. The sequence program performs measurement. The image processing program performs image processing, e.g. extraction of an edge from the image data signal by an adequate edge extraction processing method (e.g. Canny method) and calculates a position and a direction of the edge based on pixels. The calculating program calculates the relation between the edge position and the measuring point. As the storage unit 21, a semiconductor memory, etc. incorporated in the surveying instrument 1, or various types of recording medium such as FD, CD, DVD, RAM, ROM, a hard disk, a memory card, etc. may be used, which can be connected or removably mounted on the surveying instrument 1.

Figure 4:
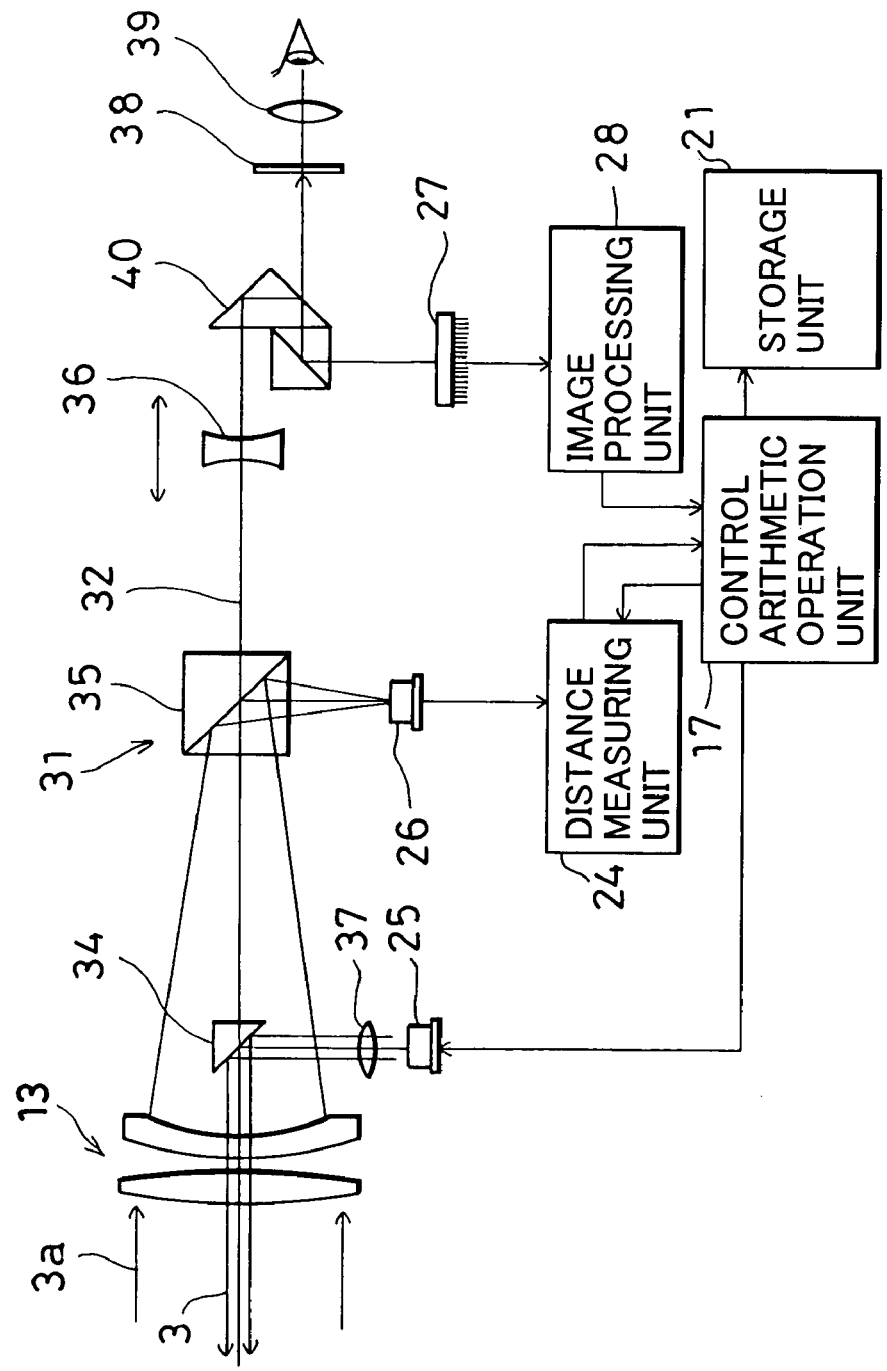
FIG. 4 is a schematical drawing of an essential portion of an optical system to be provided on the surveying instrument.

FIG. 4 represents an example of the optical system 31.

An objective lens 13, a reflection mirror 34, a dichroic mirror 35, a focusing lens 36, and an erect image prism 40 are arranged along an optical axis 32.

The light emitting unit 25 is arranged on a reflection light optical axis of the reflection mirror 34. The light emitting unit 25 is driven by the control arithmetic operation unit 17, and a light is emitted. A distance measuring light 3, or more preferably, a light having a wavelength different from that of natural light, e.g. an infrared light, is emitted. The distance measuring light 3 is turned to a parallel luminous flux by a collimator lens 37 and enters the reflection mirror 34. After being reflected by the reflection mirror 34, the distance measuring light 3 is deflected toward a direction of the optical axis 32 and is projected toward the object to be measured 2 via the reflection mirror 34.

The dichroic mirror 35 is an optical component, which reflects the reflected distance-measuring light 3a and allows the natural light to pass. The distance measuring light receiving unit 26 is arranged on a reflection optical axis of the dichroic mirror 35. Being reflected by the object to be measured 2 and converged by the objective lens 13, the reflected distance measuring light 3a is reflected by the dichroic mirror 35 and is received by the distance measuring light receiving unit 26. The distance measuring light receiving unit 26 sends a photodetection signal to the distance measuring unit 24.

At the distance-measuring unit 24, based on a photodetection result of the reflected distance measuring light 3a by the distance measuring light receiving unit 26 and also based on a photodetection result of an internal reference light (not shown), a distance to the object to be measured 2 is measured, and a result of the measurement is sent to the control arithmetic operation unit 17.

The erect image prism 40 has a plurality of reflection surfaces and projects an inverted image as an erect image, and at least one of the reflection surfaces serves as a half-mirror. The natural light from the object to be measured 2 passes through the dichroic mirror 35 and enters the erect image prism 40. The erect image prism 40 projects an image of the object to be measured 2 as an erect image and separates a part of the incident light and projects the part of the incident light.

By adjusting the focusing lens 36 along the optical axis 32, the erect image is formed on a reticle 38 so that the image on the reticle 38 can be visually confirmed by a measuring operator via an ocular lens 39. The separated part of the incident light forms an image of the image light receiving unit 27 arranged at a position conjugate with the reticle 38.

The image light receiving unit 27 sends out light receiving result to the image processing unit 28 as an image signal, which is made up by collecting image signals of individual pixels.

The image processing unit 28 extracts edges through image processing of the image signal and calculates information such as a position, an elevation angle, etc. of the edge. A result of the calculation is sent to the control arithmetic operation unit 17 as an image data signal associated with the pixel signal. The control arithmetic operation unit 17 performs calculation as required based on the image data signal thus sent out or stores the image data signal to the storage unit 21. The image processing unit 28 sends out an image signal equivalent to the image formed on the reticle 38 or an image signal magnified or reduced in size to the control arithmetic operation unit 17 together with the image data signal. The control arithmetic operation unit 17 can display an image within collimation range by the telescope unit 8 on the display unit 14.

Figure 5:
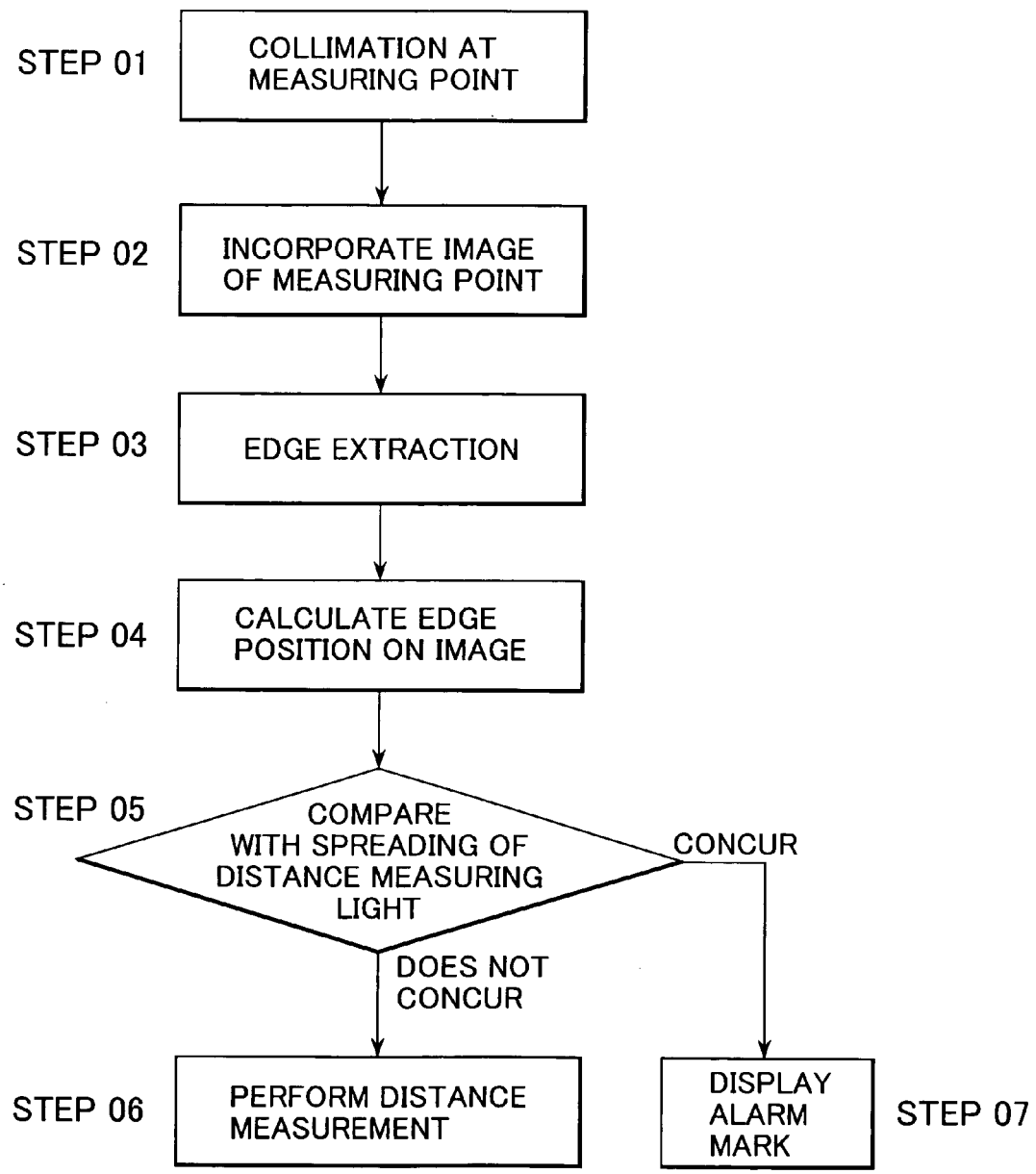
FIG. 5 is a flow chart to explain operation of an embodiment of the present invention.
Figure 6:
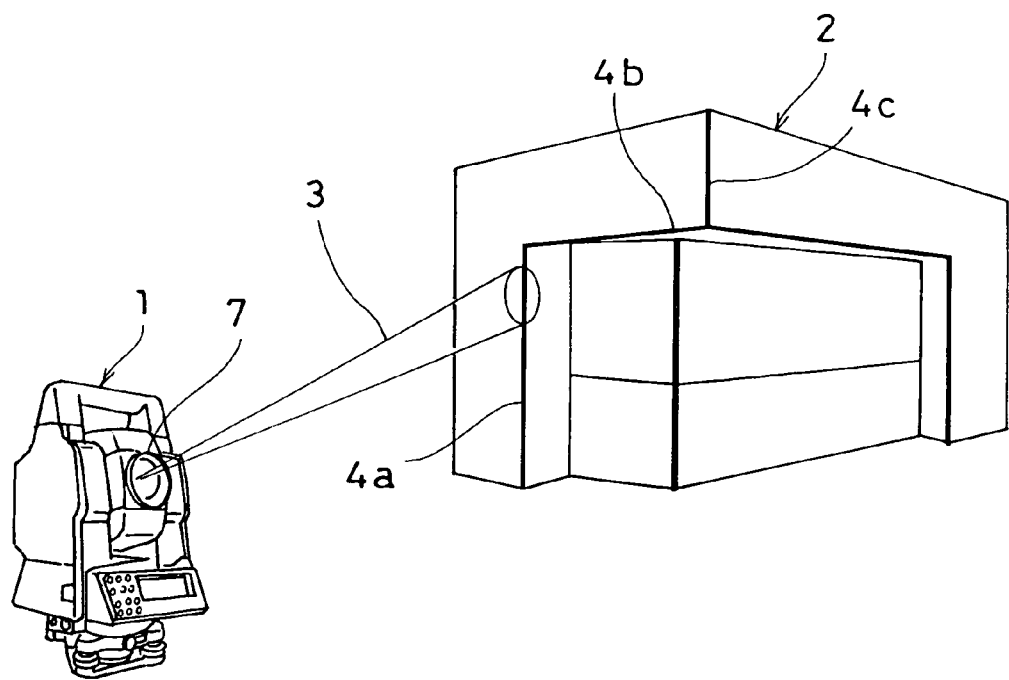
FIG. 6 is a perspective view to explain a conventional type example.
Figure 7:
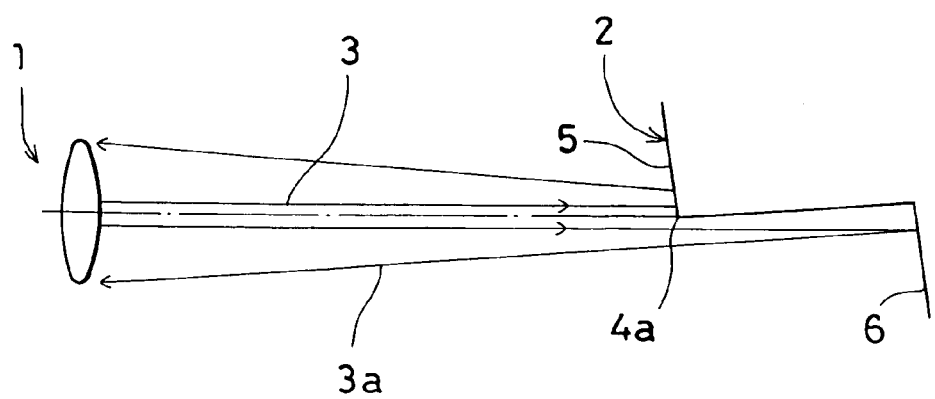
FIG. 7 is a drawing to explain measuring condition at an edge portion in the conventional example.

Referring to FIG. 5 and FIG. 6, description will be given on operation.

The surveying instrument 1 is directed to the object to be measured 2. A measuring point on the object to be measured 2 is determined, and a collimating direction is aligned with the measuring point by using the telescope unit 8.

When the collimating direction is determined, a vertical angle and a horizontal angle are detected by the vertical angle measuring unit 18 and the horizontal angle measuring unit 19. The vertical angle and the horizontal angle thus detected are stored in the storage unit 21 (Step 01).

Then, an image formed on the image light receiving unit 27 is incorporated in the image processing unit 28 (Step 02). This image is an image including the measuring point and its surroundings. The image thus incorporated is displayed on the display unit 14, and the measuring operator can confirm the measuring point without directly collimating the measuring point by the telescope unit 8.

Image processing is performed by the image processing unit 28. For instance, an edge is extracted by Canny method, for instance. Edge extraction is performed to all of the edges included in the image (Step 03).

A focal length "f" of the telescope unit including the objective lens 13 and the focusing lens 36 is already known. A position of a pixel "d" represents an angle of view according to tan (d/f). Therefore, the position of the pixel on the image processing unit 28 reflects a vertical angle and a horizontal angle with respect to the collimating direction, i.e. the optical axis 32. By comparing the position of the edge on the image processing unit 28 with the position of the pixel, the vertical angle and the horizontal angle can be calculated at the same time. The calculation of the position of the extracted edge is performed for all of the edges (Step 04).

Figure 2:
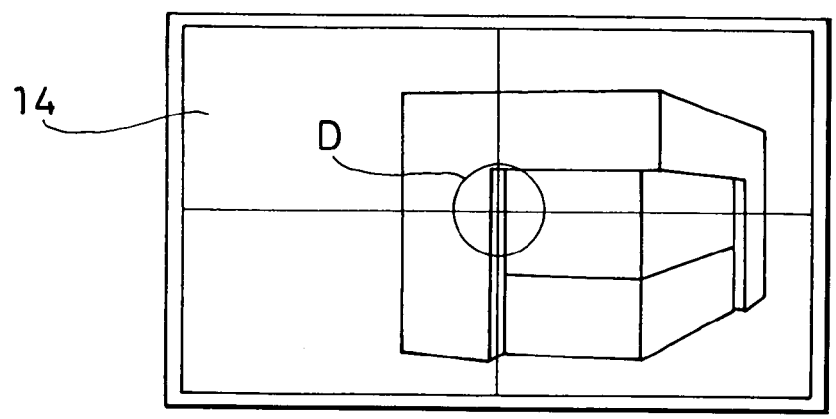
FIG. 2 is a partial view showing a display unit provided on the surveying instrument.

The association of a spreading range D (See FIG. 2) of the distance measuring light 3 with the range on the image processing unit 28 is calculated. A spreading angle of the distance measuring light 3 is already known. Because the spreading angle is not influenced by the change of the distance between the surveying instrument 1 and the object to be measured 2, a spreading range D' on the image processing unit 28 can be specified by the image processing unit 28, the focal length f and the spreading angle of the distance measuring light 3.

The result of edge extraction, information of the edge position, and the spreading range D (beam diameter) are recorded in the storage unit 21 via the control arithmetic operation unit 17.

The control arithmetic operation unit 17 calculates whether there is an edge or not, which is included in the spreading range D of the distance measuring light 3 around the optical axis 32 by comparing the spreading range D (See FIG. 2) and the edge position (Step 05).

When it is confirmed that all extracted edges are not within the spreading range D of the distance measuring light 3, distance measurement is started. From the light emitting unit 25, the distance measuring light 3 is projected to the measuring point. The reflected distance measuring light 3a reflected at the measuring point is received by the distance measuring light receiving unit 26, and the distance to the measuring point is measured by the distance measuring unit 24 (Step 06).

The control arithmetic operation unit 17 compares and calculates whether there is an edge or not, which is included within the spreading range D of the distance measuring light 3 around the optical axis 32. If it is judged that there is an edge within the spreading range D of the distance measuring light 3, the measuring point is regarded as inadequate, and a caution notice such as an alarm mark (not shown) is displayed. Or, an alarm sound is issued alone or together with an alarm mark, and the measuring operator is notified that the measuring point is inadequate (Step 07). Or, the measuring operation is stopped.

As described above, all of the edges included in the incorporated image are extracted. Accordingly, for instance, when the measuring point is changed within the range of the image shown in FIG. 2, extraction of the edge is not performed. By selecting the measuring point, it is judged immediately whether the measuring point is adequate or not.

In the above explanation, it is described that the measurement is not performed when the distance measuring light 3 comes to an edge, while it may be designed in such manner that the distance is measured at the time when the vertical angle and the horizontal angle are obtained in the above Step 01. In this case, the correspondent result of measurement is to be deleted or to be made invalid if the presence of edge is confirmed in the spreading angle D of the distance measuring light 3 in the above Step 05. An alarm mark (not shown) is displayed on the display unit 14, and it is displayed that the result of measurement has been deleted.

For instance, when automatic surveying operation is performed for a multiple of points by a total station, etc., the result of measurement is deleted or is regarded as invalid only for the measuring point where the distance measuring light 3 comes to an edge. This contributes to the improvement of measurement accuracy.

Next, in another embodiment, there is a method, by which image processing for edge extraction is carried out only for the spreading range D (See FIG. 2) of the distance measuring light 3.

In this case, when an edge is extracted (detected) by image processing, it is judged immediately that the measuring point is inadequate. Therefore, the procedures in Step 03, Step 04, and Step 05 in FIG. 5 can be omitted. This is effective when there are not many measuring points.

Next, when the object to be measured 2 is a building and so on, and when lines or the like are drawn on a wall surface, it may be judged that the measuring point is inadequate in the edge processing. In such case, the measuring operator may confirm the position of the measuring point by the display unit 14 and may operate the canceling switch 42. Thus, the calculation to find out whether it is adequate or not for edge processing can be made invalid. Measurement result may be made valid again or distance measurement may be carried out, and accurate measurement result can be obtained.

In the above embodiment, a common optical system is used for the distance measuring unit and the image pickup unit, while the image pickup unit may be provided independently.

What is claimed is:

1. A surveying instrument for projecting a distance measuring light to an object to be measured and for measuring a distance from a reflected light, comprising at least an image pickup unit for picking up an image of a spreading range of the distance measuring light, and a control unit for performing edge extraction from the image captured by said image pickup unit, wherein said image pickup unit picks up the image of the spreading range of the distance measuring light for each measuring point, and said control unit judges for each measuring point whether there is an edge or not within the image.

2. A surveying instrument according to claim 1, wherein edge extraction is performed for the spreading range.

3. A surveying instrument according to claim 1, wherein edge extraction is performed for an entire range of the pickup image.

4. A surveying instrument according to claim 1, further comprising a notifying means, wherein said notifying means notifies that the measuring point is inadequate when there is an edge in the spreading range.

5. A surveying instrument according to claim 4, wherein said notifying means is a display unit, and said display unit displays a caution notice when there in an edge within the spreading range.

6. A surveying instrument according to claim 1, wherein distance measurement is performed after it is judged whether an edge is present or not within the spreading range, and in case it is judged that there is an edge within the spreading range, said control unit stops distance measuring operation.

7. A surveying instrument according to claim 1, wherein distance measurement is performed before it is judged whether an edge is present or not within the spreading range, and in case it is judged that there is an edge within the spreading range, said control unit deletes a measurement result or makes the measurement result invalid.

8. A surveying instrument according to claim 6 or 7, wherein in case said control unit judges that there is an edge within the spreading range and in case it is confirmed that the measuring point is adequate, there is provided a canceling switch to make the judgment by said control unit invalid.

\* \* \* \* \*